(12) United States Patent
Benettolo

(10) Patent No.: US 10,495,116 B2
(45) Date of Patent: Dec. 3, 2019

(54) EXPANSION TANK WITH IMPROVED PIPE FITTING

(71) Applicant: ZILMET SpA, Limena (PD) (IT)

(72) Inventor: Riccardo Benettolo, Limena (IT)

(*) Notice: Subject to any disclaimer, the term of this patent is extended or adjusted under 35 U.S.C. 154(b) by 66 days.

(21) Appl. No.: 15/571,843

(22) PCT Filed: Apr. 20, 2016

(86) PCT No.: PCT/IB2016/052239
§ 371 (c)(1),
(2) Date: Nov. 5, 2017

(87) PCT Pub. No.: WO2016/189403
PCT Pub. Date: Dec. 1, 2016

(65) Prior Publication Data
US 2018/0135658 A1 May 17, 2018

(30) Foreign Application Priority Data

May 28, 2015 (IT) .................... 102015000019020

(51) Int. Cl.
| | |
|---|---|
| *F16L 55/04* | (2006.01) |
| *F15B 1/10* | (2006.01) |
| *F24D 3/10* | (2006.01) |
| *F15B 1/22* | (2006.01) |
| *F16L 55/033* | (2006.01) |

(52) U.S. Cl.
CPC .............. *F15B 1/10* (2013.01); *F15B 1/22* (2013.01); *F16L 55/0338* (2013.01); *F24D 3/1008* (2013.01); *F24D 3/1016* (2013.01); *F15B 2201/20* (2013.01); *F15B 2201/205* (2013.01); *F15B 2201/315* (2013.01); *F15B 2201/3151* (2013.01); *F15B 2201/405* (2013.01); *F15B 2201/41* (2013.01)

(58) Field of Classification Search
CPC .......... F15B 1/10; F15B 1/22; F16L 55/0338; F24D 3/1016; F24D 3/1008
USPC ............................................. 138/30
See application file for complete search history.

(56) References Cited

U.S. PATENT DOCUMENTS

| | | | | |
|---|---|---|---|---|
| 2,710,630 | A | * | 6/1955 | Greer ................ F15B 1/22 138/30 |
| 3,247,999 | A | * | 4/1966 | Stilwell ............ B65D 90/046 220/62.21 |
| 3,439,712 | A | * | 4/1969 | Mercier ............. F15B 1/22 138/30 |
| 3,524,475 | A | * | 8/1970 | Kirk, Jr. ............ F15B 1/08 138/30 |

(Continued)

FOREIGN PATENT DOCUMENTS

| | | |
|---|---|---|
| EP | 2851602 | 3/2015 |
| WO | 2004079244 | 9/2004 |

*Primary Examiner* — James F Hook
(74) *Attorney, Agent, or Firm* — Themis Law

(57) ABSTRACT

An expansion tank includes two half-shells coupled to each other, an inner flexible membrane suited to divide the inside of the casing in two compartments, a counter cap made of a thermoplastic material, a pipe fitting suited to provide a connection and having a first tubular portion and a second portion in the shape of a flat ring that are made of a thermoplastic material, wherein the second ring-shaped portion is joined to the counter cap at the level of an opening in the tank.

10 Claims, 1 Drawing Sheet

(56) References Cited

U.S. PATENT DOCUMENTS

| | | | | |
|---|---|---|---|---|
| 4,112,978 A * | 9/1978 | Olbrich | ............ | F15B 1/18 |
| | | | | 137/504 |
| 4,164,242 A * | 8/1979 | Sandau | ............ | F15B 1/18 |
| | | | | 138/131 |
| 4,671,325 A * | 6/1987 | Otter | ............ | F15B 1/22 |
| | | | | 138/30 |
| 4,785,956 A * | 11/1988 | Kepler | ............ | B29C 53/605 |
| | | | | 138/30 |
| 5,379,913 A * | 1/1995 | Rieke | ............ | B21D 51/40 |
| | | | | 220/495.06 |
| 5,386,925 A * | 2/1995 | Lane | ............ | F16L 55/053 |
| | | | | 220/4.12 |
| 5,551,590 A * | 9/1996 | Mazur | ............ | F24H 9/124 |
| | | | | 220/23.83 |
| 6,517,117 B1 * | 2/2003 | Lai | ............ | F16L 5/10 |
| | | | | 285/139.1 |
| 6,915,922 B2 * | 7/2005 | Wang | ............ | B67D 7/0288 |
| | | | | 138/30 |
| 7,363,944 B2 * | 4/2008 | Lai | ............ | F24D 3/1008 |
| | | | | 138/26 |
| 2003/0155386 A1 | 8/2003 | Lai | | |
| 2006/0290137 A1 | 12/2006 | Benettolo | | |
| 2009/0107570 A1 * | 4/2009 | Weber | ............ | F17C 1/16 |
| | | | | 138/30 |
| 2010/0084408 A1 | 4/2010 | Wang | | |

* cited by examiner

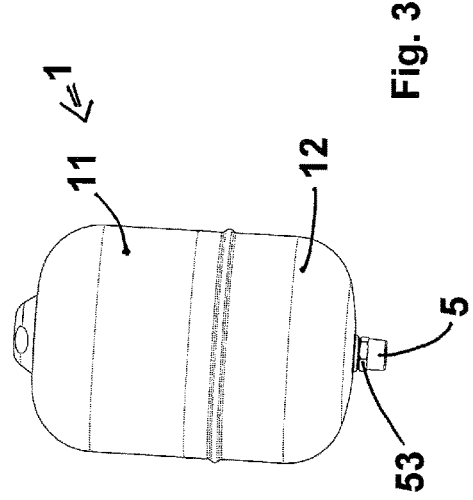
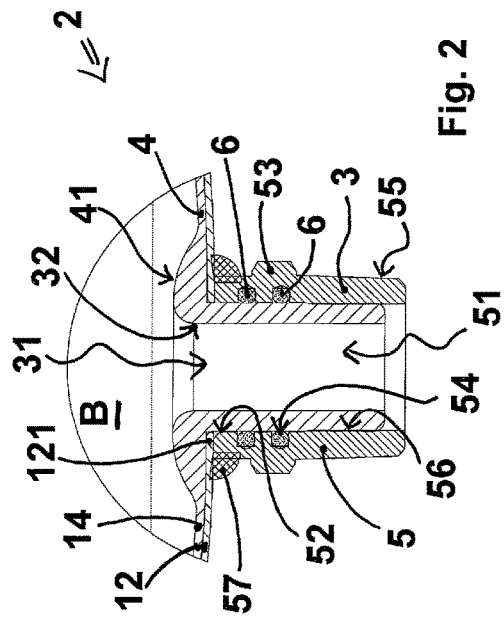
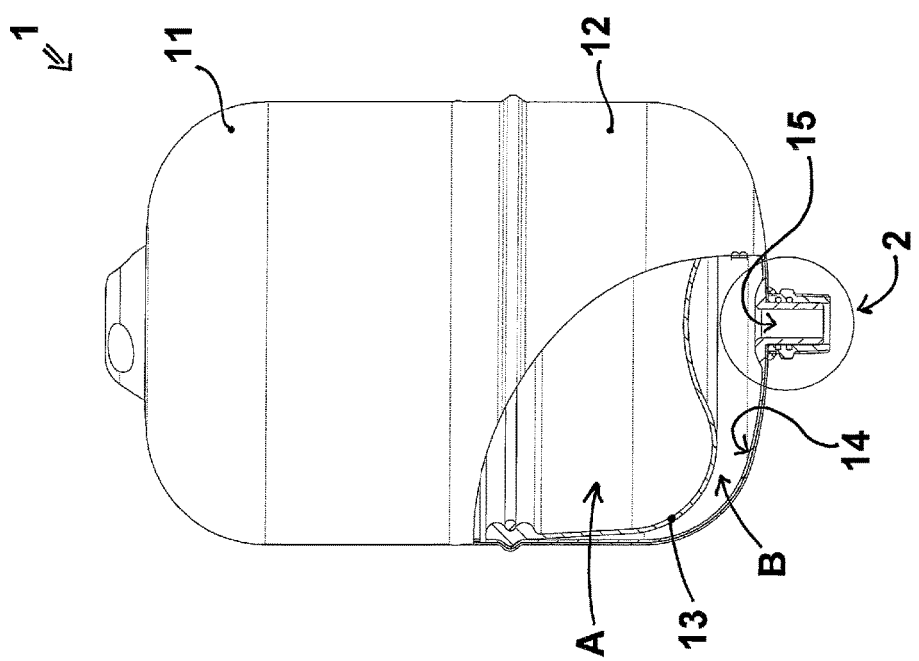

EXPANSION TANK WITH IMPROVED PIPE FITTING

The present invention concerns the sector of expansion tanks and in particular it concerns a new expansion tank equipped with an improved pipe fitting.

Expansion tanks are hydraulic components commonly employed in boilers for domestic heating, in heating systems and sanitary systems, and serve the function of compensating for the variations in volume produced by the temperature variations of the circuit fluid, thus avoiding dangerous pressure increases in the circuit itself, which otherwise should be absorbed by the pipes and other components of the system.

Expansion tanks are hydraulic components commonly present also in pumping systems and lifting systems, and serve the function of accumulating the fluid present in the circuit in order to successively convey it back to the circuit.

Expansion tanks are known that comprise two rigid cap-shaped half-shells, usually made of a metallic material, opposing each other and joined to as to form a closed casing.

The inside is provided with a membrane that divides the internal space into two compartments respectively intended to contain the compressible gas suited to compensate for the increase in volume of the system fluid and the non-compressible fluid subjected to volume variations.

One of the two half-shells is provided with a pipe fitting communicating with the adjacent internal compartment for the connection of the compartment itself to the hydraulic circuit. The other half-shell is provided with a valve carrier with a preload and pressurized gas or air adjusting valve.

The material used for making the membranes of expansion tanks is normally suited to guarantee a suitable sealing effect and is resistant to elastic deformation and to the temperature variations of the fluid present in the circuit.

The liquid present in the hydraulic circuit to which the expansion tank is applied can be of various types, usually it consists of water or water solutions.

The internal metallic surface of the half-shell of the expansion tank into which the liquid of the hydraulic circuit flows is directly exposed to contact with the liquid and therefore is subjected to the corrosive effect of the water itself or other fluids circulating therein.

In order to resolve this drawback, expansion tanks have been developed which comprise two metallic half-shells coupled together, an inner flexible membrane suited to tightly separate the internal compartment of said closed casing into two compartments, and wherein inside said second half-shell there is a counter cap made of a thermoplastic material, meaning a material resistant to the corrosive action of fluids.

Said counter cap is structured in such a way that it adheres to the internal surface of said second half-shell and is provided with an opening that is identical to and aligned with the opening of the pipe fitting that connects the second half-shell to the system.

Said counter cap is generally constrained in a tight manner to the half-shell at the level of said pipe fitting and inside the half-shell, for example by means of a metal ring.

Analogously, pipe fittings resistant to corrosion are known, which consist of a pipe that is internally threaded at least over its section facing towards the inside of said second half-shell and of an inner sealing flange made of a thermoplastic material, mounted inside said counter cap and suited to be screwed into said pipe, so as to protect the pipe itself.

In particular, said inner sealing flange in turn comprises an externally threaded tubular section suited to be screwed on the inner thread of said pipe fitting located towards the system, and a flat ring orthogonal to the axis of said threaded tubular section, suited to adhere to the inner counter cap of said second half-shell.

The tight screwing of said inner flange and the use of suitable gaskets prevent the liquid and the air present in the system from leaking between the second half-shell and the inner counter cap or between the inner flange and the pipe fitting towards the system.

This type of pipe fitting, being made up of at least two parts, needs complex assembly operations that have to be carried out from the inside and furthermore stress and use may affect tightness over time.

In order to overcome said drawbacks, a new type of expansion tank with improved pipe fitting has been designed and produced.

The main object of the present invention is to provide an expansion tank with guaranteed tightness between the pipe fitting and the inside of the tank. The pipe fitting, in fact, is substantially welded or it forms a single body with the counter cap of the half-shell, which is made of a thermoplastic material.

It is another object of the present invention to provide an expansion tank with a quicker assembly procedure.

It is another object of the present invention to provide an expansion tank where the corrosive agents contained in the tank itself cannot damage the pipe fitting.

It is another object of the present invention to provide an expansion tank that can be normally connected to external pipes, thanks to the presence of a further threaded external element.

It is another object of the present invention to provide an expansion tank that can be easily connected to external pipes, thanks to the special configuration of said threaded external element.

These and other direct and complementary objects are achieved by the new expansion tank equipped with an improved pipe fitting, comprising the following among its main parts:
- at least two half-shells coupled with each other so as to form a closed casing;
- at least one inner flexible membrane suited to divide in a tight manner the internal compartment of the closed casing into at least two compartments, of which a first compartment is intended to contain the compressible fluid that compensates for the volume increase of the fluid present in the system and the second compartment is intended to contain the non-compressible fluid subject to volume variations;
- at least one counter cap made of a thermoplastic material introduced in said second half-shell;
- at least one pipe fitting suited to connect said second compartment to the system requiring compensation, said pipe fitting being mounted in an opening made in a corresponding manner in said second half-shell and in said counter cap, and wherein said pipe fitting in turn comprises at least one first substantially tubular portion made of a plastic material and housed in said opening and projecting from it, and at least one portion in the shape of a flat ring, orthogonal to the axis of said first tubular portion and housed inside said counter cap.

In a preferred solution, said first tubular portion and said ring-shaped portion of said pipe fitting are in a single piece and are made of a thermoplastic material.

In an alternative solution, said tubular portion and said ring-shaped portion are made separately and are tightly joined to each other through a mechanical and/or chemical process.

Said single body made up of said tubular portion and said ring-shaped portion is welded or mechanically and/or chemically joined to said counter cap at the level of said opening or the two parts are made so as to form a single body with said counter cap.

In particular, said ring-shaped portion and said first tubular portion can be made of the same material used to make said counter cap, for example polypropylene or another thermoplastic or thermoformed material.

The pipe fitting of the new expansion tank comprises also a further substantially tubular element open at both ends, in the shape of a bushing and fitted on said first tubular portion of said pipe fitting from the outside of said second half-shell, so that the edge of said opening of the half-shell is substantially interposed between said ring-shaped portion and an end of said bushing.

The outside of said element in the shape of a bushing is at least partially threaded or in any case shaped for connection to at least one pipe of the system requiring compensation.

Said element in the shape of a bushing is preferably made of a metallic material, for example steel, iron or another material, and is welded to said second half-shell in proximity to the opening. Said element in the shape of a bushing can also be made of a plastic material.

In the preferred solution, said ring-shaped portion of the pipe fitting comprises at least one thicker part facing towards the inside of the second compartment, suited to stiffen the pipe fitting itself while at the same time guaranteeing its correct position and its tightness.

In the preferred solution, said element in the shape of a bushing comprises also a shaped annular part close to said end facing towards the second half-shell, wherein said shaped part has a substantially hexagonal cross section or in any case a cross section suited to ensure that it can be held with wrenches or tools for screwing and fixing said element in the shape of a bushing to said pipe of the system.

In order to ensure tightness between said first tubular portion and said element in the shape of a bushing, one or more gaskets, for example annular gaskets, are mounted between said element in the shape of a bushing and said tubular portion.

For this purpose, the internal surface of said element in the shape of a bushing is substantially smooth, with one or more annular seats suited to house said annular gaskets.

As an alternative to or in combination with said gaskets, the interference between said element in the shape of a bushing and said tubular portion of the pipe fitting is used to guarantee tightness.

Said expansion tank is intended to contain hot or cold water, sanitary water, water for domestic use, recirculation water, etc.

Said expansion tank can have any volume and therefore it can be used for multiple applications.

The characteristics of the new expansion tank with improved pipe fitting are illustrated in greater detail in the following description, with reference to the drawings that are attached hereto by way of non-limiting example.

FIG. 1 shows a three-dimensional view in partial cross section of the new expansion tank (1) with improved pipe fitting (2).

FIG. 2 shows a sectional view of the improved pipe fitting (2).

FIG. 3 shows a three-dimensional view of the new expansion tank (1) with improved pipe fitting (2).

The new expansion tank (1) comprises two half-shells (11, 12) coupled together in such a way as to form a closed casing and an inner flexible membrane (13) suited to divide the closed casing into two compartments (A, B) in a tight manner.

Said half-shells (11, 12), for example, are made of a substantially rigid metallic material, for example steel, and/or of a plastic material, while said membrane (13) is made of a material resistant to corrosion and stress.

The first compartment (A) is intended to contain the compressible fluid that compensates for the increase in the volume of the fluid present in the system, while the second compartment (B) is intended to contain the non-compressible fluid that is subject to volume variations and to be hydraulically connected to the system requiring compensation through at least one pipe fitting (2).

At least inside said second half-shell (12) there is at least one counter cap (14) made of a thermoplastic material, suited to come directly into contact with the fluid contained in said second compartment (B) and thus to prevent said fluid from coming into contact with the second half-shell (12).

Said counter cap (14), for example, substantially adheres to the internal surface of said second half-shell (12).

Said second half-shell (12) and said counter cap (14) are provided with at least one opening (15) suited to house a pipe fitting (2) for connection to the system requiring compensation.

Said opening (15) houses said pipe fitting (2), in turn comprising a first portion (3) that is substantially tubular or holed axially (31), preferably cylindrical, housed in said opening (15) and projecting from it, and a second portion in the shape of a flat ring (4), integral with an end (32) of said tubular portion (3) and orthogonal to the axis of said tubular portion (3) itself.

Said ring-shaped portion (4) in turn is joined to said counter cap (14) in the second half-shell (12) at the level of said opening (15), thus placing the inside of said second compartment (B) in communication with the outside of the tank (1) through said tubular portion (3), which is thus substantially external to the tank (1).

In the preferred solution illustrated in the drawings, said counter cap (14), said ring-shaped portion (4) and said tubular portion (3) of the pipe fitting (2) are substantially made in a single body or, however, are mechanically and/or chemically joined to each other in such a way as to guarantee continuity and tightness.

Said counter cap (14), said ring-shaped portion (4) and said tubular portion (3) of the pipe fitting (2) are preferably made of the same thermoplastic or thermoformed material.

The pipe fitting (2) comprises also a further element in the shape of a bushing (5) that is substantially tubular or axially holed (51) and fitted on said first tubular portion (3) of said pipe fitting (2).

The part close to the edge (121) of said opening (15) of the second half-shell (12) is substantially interposed and constrained between said ring-shaped portion (4) and an end (52) of said element in the shape of a bushing (5), thus guaranteeing the stability of the pipe fitting (2) itself.

Said ring-shaped portion (4) of the pipe fitting (2) comprises at least one stiffening thicker part (41), preferably in the shape of a ring and preferably facing towards the inside of the second compartment (B).

Said element in the shape of a bushing (5) is preferably made of a metallic material and comprises at least one part

(55) that is externally threaded or in any case shaped in such a way that it can be connected to at least one pipe of the system requiring compensation, and is preferably welded (57) to said second half-shell (12) in proximity to said opening (15).

Said element in the shape of a bushing comprises also a shaped annular part (53) close to said end (52) facing towards the second half-shell (12), wherein the cross section of said shaped part (53) is substantially hexagonal or polygonal or in any case suited to allow said shaped part to be held with wrenches or tools.

Said element in the shape of a bushing (5) comprises also one or more annular seats (54) made on its internal surface (56) and suited to house one or more annular sealing gaskets (6) suited to ensure tightness with respect to said tubular portion (3) of the pipe fitting (2). Therefore, with reference to the above description and the attached drawings the following claims are expressed.

The invention claimed is:

1. An expansion tank (1) comprising:
   a first and a second half-shells (11, 12) coupled to each other to form a closed casing;
   an inner flexible membrane (13) sealingly dividing an inside of the closed casing into at least two compartments (A, B), of which a first compartment (A) is adapted to contain a compressible compensation fluid and a second compartment (B) is adapted to contain a non-compressible fluid subject to volume variations;
   at least one counter cap (14) made of a thermoplastic material substantially in contact with said second half-shell (12) and adapted to be directly in contact with the non-compressible fluid contained in said second compartment (B);
   at least one pipe fitting (2) adapted to connect said second compartment (B) to a system requiring compensation, said pipe fitting (2) being mounted at a level of an opening (15) made in said second half-shell (12) and in said counter cap (14),
   wherein said pipe fitting (2) comprises a first substantially tubular portion (3) housed in said opening (15) and projecting from said opening, and a second portion shaped as a flat ring (4) integral with one end (32) of said tubular portion (3), said second portion being substantially orthogonal to an axis of said tubular portion (3) and disposed to remain inside said second half-shell (12), said first portion (3) and said second portion (4) being made of a thermoplastic material, and
   wherein said second portion (4) is joined to said counter cap (14) at a level of said opening (15).

2. The expansion tank (1) according to claim 1, wherein said first portion (3) and said second portion (4) of said pipe fitting (2) form a single body that is welded or mechanically and/or chemically joined to said counter cap (14).

3. The expansion tank (1) according to claim 1, wherein said first portion (3) and said second portion (4) of said pipe fitting (2) are mechanically and/or chemically joined to each other, and wherein said second portion (4) is welded or mechanically and/or chemically joined to said counter cap (14).

4. The expansion tank (1) according to claim 1, wherein said first portion (3) and said second portion (4) of said pipe fitting (2) form a single body with said counter cap (14).

5. The expansion tank (1) according to claim 1, wherein said pipe fitting (2) further comprises a substantially tubular element (5) shaped as a bushing, fitted on said first portion (3) of said pipe fitting (2) from an outside of the expansion tank (1), and wherein portion of the second half-shell (12) that is in proximity of an edge (121) of said opening (15) is substantially interposed and constrained between said second portion (4) of the pipe fitting (2) and one end (52) of said substantially tubular element (5), thereby providing stability of the pipe fitting (2).

6. The expansion tank (1) according to claim 5, wherein said substantially tubular element (5) comprises at least one portion (55) that is externally threaded or shaped to provide a connection with at least one pipe of the system requiring compensation.

7. The expansion tank (1) according to claim 5, wherein said substantially tubular element (5) comprises a shaped annular part (53) having a cross section that is substantially polygonal or in any case adapted to be held with wrenches or tools.

8. The expansion tank (1) according to claim 5, wherein a connection between said first portion (3) and said substantially tubular element is sealingly tight due to one or more annular sealing gaskets (6) interposed and constrained between said first portion (3) and said substantially tubular element (5) and/or through interference.

9. The expansion tank (1) according to claim 5, wherein said substantially tubular element (5) is made of a metallic and/or plastic material.

10. The expansion tank (1) according to claim 1, wherein said second portion (4) of the pipe fitting (2) comprises at least one stiffening thicker part (41) facing towards an inside of the second compartment (B).

* * * * *